United States Patent
Lugschitz

(10) Patent No.: US 10,992,782 B2
(45) Date of Patent: Apr. 27, 2021

(54) METHOD FOR PERFORMING A SERVER-SPECIFIED PROGRAM START-UP VIA A CLIENT

(71) Applicant: Werner Lugschitz, Woellersdorf (AT)

(72) Inventor: Werner Lugschitz, Woellersdorf (AT)

( * ) Notice: Subject to any disclaimer, the term of this patent is extended or adjusted under 35 U.S.C. 154(b) by 0 days.

(21) Appl. No.: 16/480,510

(22) PCT Filed: Jan. 22, 2018

(86) PCT No.: PCT/AT2018/060018
§ 371 (c)(1),
(2) Date: Jul. 24, 2019

(87) PCT Pub. No.: WO2018/136984
PCT Pub. Date: Aug. 2, 2018

(65) Prior Publication Data
US 2020/0228632 A1 Jul. 16, 2020

(30) Foreign Application Priority Data
Jan. 24, 2017 (AT) .............................. A 50040/2017

(51) Int. Cl.
*H04L 29/06* (2006.01)
*H04L 29/08* (2006.01)
*G06F 9/451* (2018.01)

(52) U.S. Cl.
CPC .............. *H04L 67/40* (2013.01); *G06F 9/452* (2018.02); *H04L 63/083* (2013.01); *H04L 67/141* (2013.01); *H04L 67/146* (2013.01); *H04L 67/42* (2013.01)

(58) Field of Classification Search
CPC ...... H04L 67/40; H04L 63/083; H04L 67/141; H04L 67/146; H04L 67/42; G06F 9/452
See application file for complete search history.

(56) References Cited

U.S. PATENT DOCUMENTS

| 6,233,543 | B1 | 5/2001 | Butts et al. | |
| 2008/0137133 | A1* | 6/2008 | Trappe | G06F 3/1288 358/1.15 |
| 2008/0201485 | A1 | 8/2008 | Patwardhan et al. | |
| 2016/0366155 | A1* | 12/2016 | El-Moussa | H04L 63/145 |
| 2018/0115566 | A1* | 4/2018 | Azvine | G06F 17/141 |

\* cited by examiner

*Primary Examiner* — Minh Chau Nguyen
(74) *Attorney, Agent, or Firm* — Laurence A. Greenberg; Werner H. Sterner; Ralph E. Locher

(57) ABSTRACT

A method performs a program start-up with which a remote desktop session is set up between the client and the server. A data exchange program runs on the client, which creates a data exchange connection to a server-side data exchange program. The server-side data exchange program assigns a unique key after the set up of the data exchange connection. The client-side data exchange program determines the user who has set up a remote desktop session with the server, and transmits their username to the server-side data exchange program. The server-side data exchange program stores the usernames together with the key, wherein, if the remote desktop session exists, a program is run on the server, which transmits a program start-up to an interface, to which the username is attributed. The server-side data exchange program transmits the program start-up to the client with which there is a connection to the relevant key.

10 Claims, 4 Drawing Sheets

METHOD FOR PERFORMING A SERVER-SPECIFIED PROGRAM START-UP VIA A CLIENT

BACKGROUND OF THE INVENTION

Field of the Invention

The invention relates to a method for executing a server-specified program call via a client according to the independent method claim.

Numerous different server-side software services are known in the art, and are grouped together under the generic term "Software as a Service." These are generally server-side services that allow a user who is logged on to a server via a client computer to start a remote desktop session, generating a user interface—typically a graphical user interface—on the server that is then forwarded to the client. Likewise, user input that the user performs on the client computer is forwarded to the server and executed on the server.

The advantage of making programs available via such a remote desktop session, compared to distributing software for local installation, is that certain programs that the server operator makes available do not need to run in any user environment, but only in an operator-defined environment on the relevant server. In particular, the required standard program libraries may be pre-installed.

Typically, such operator-provided software by the operator is a database application. In a typical installation, an operating system is installed on the server that processes the running of the relevant application, in particular user interactions of the client, and creates the virtual screen content that is forwarded to the client as part of the remote desktop session.

Problems with such systems always occur when data is to be transferred between such a server and a client. Typically, the number of applications made available on the remote desktop system is limited, so that some of the data created on the server must be transferred to the client. In addition, it may also be necessary to use client resources such as for example printers or local directories.

Because the remote desktop system on the server is a different computer from the client, it is not possible to print or display documents that are present on the server on a printer connected to the client and located in the client's local network. For example, if files having a specific file format are used to store certain information on the client, these files may be able to be displayed on the server or on the remote desktop session, but under certain circumstances the client may use a completely different standard program that is not available on the server to display files with the same file format.

BRIEF SUMMARY OF THE INVENTION

The object of the invention is to overcome these problems and to provide a method for executing a server-specified program call on a client, by means of which data or information located on the server may be correctly processed via the client.

The invention solves this problem with a method of the kind mentioned above having the features of the independent method claim. It is provided therein, that a) a remote desktop session is set up between the client and the server at the request of the client, and wherein a username and password that are allocated to the user are transmitted from the client to the server, the connection address of which is specified by the user, b) wherein the connection address and the username are stored locally on the client after the remote desktop session has been set up, c) wherein a client-side data exchange program runs on the client and creates a data exchange connection to a server-side data exchange program running on the server, and the server-side data exchange program assigns a key that uniquely identifies the relevant data exchange connection after the data exchange connection has been set up, d) wherein based on the locally stored assignment between the username and the connection address of the server, the client-side data exchange program ascertains the username of the user who has currently or most recently set up a remote desktop session with the server, and e) if such a user is found, the username of that user is transmitted from the client-side data exchange program to the server-side data exchange program; and f) the server-side data exchange program stores the username together with the key that identifies the relevant data exchange connection in an assignment table, g) wherein a program is executed on the server if the remote desktop session exists, h) wherein this program transmits a program call to an interface provided by the server-side data exchange program, and the username used for the remote desktop session is attached to the program call, i) wherein the server-side data exchange program searches for the key assigned to the username in the assignment table based on the username, and j) the server-side data exchange program transmits the program call to the client that has a connection with the relevant key, and k) wherein the client-side data exchange program adapts the program call it receives to the local client-side configuration and subsequently executes it.

For the advantageous transfer and processing of files between server and client it may be provided that:

in step j), the server-side data exchange program searches for the files that are specified in the program call and are required for the program call and transmits these files together with the program call to the client, and wherein for the client-side data exchange program in step k), a standard program is selected that is stored in the local configuration of the client for handling files of the type corresponding to the type of the transmitted file and this standard program is caused to handle the transmitted file according to the program call, in particular to hold the file ready for viewing and/or modification or to print the file.

To enable the data stored on the server and transferred to the client to be used in a manner that is as seamless as possible with the how data located on the client is used, it may be provided that the client has a data link to a memory with a number of files, wherein in step j) a program call is created that relates to a file located in the memory, in step k), the client-side data exchange program ascertains and locates the relevant file, and wherein for the client-side data exchange program in step k), a standard program is selected that is stored in the local configuration of the client for handling files of the type corresponding to the type of the transmitted file and this standard program is caused to handle the transmitted file according to the program call, in particular to hold the relevant file ready for viewing and/or modification or to print the file.

In order to be able to store on the server references to files that are stored locally on the client or on a local network connected to the client, it may be provided that standard calls of standard programs are specified in the local configuration of the client for certain predetermined types of program calls and file types, and in that, in the event that a program call of the relevant type is to be executed with respect to a file of the relevant file type, the relevant standard call is executed using this file.

In order to enable individual processes to be completed in an automated fashion locally on the user's client based on an automation step that is present and will be executed server-side, it may be provided that in step j), a program call for executing a script on the client is specified, to which are optionally attached a number of files to be transferred and/or a number of paths to locally stored files, and in step k), the script is executed by the client-side data exchange program, which optionally accesses the transmitted or locally stored files.

It may be provided that the following actions are executed as individual steps within such an automation step:

opening files for editing or viewing, and/or printing files on a printer predetermined by the program call or on the standard printer without consulting the user, and/or printing files by means of a print dialog, and/or copying a file into a predetermined folder or a user-specified folder, and/or writing an e-mail based on the recipient, subject and body text specified in the program call and, if applicable, one or more files transmitted by the server and/or specified by indicating a path.

To enable a user to use a plurality of clients, it may be provided that after setting up a remote desktop session and a data exchange connection between a client and a server, an additional remote desktop session is set up from an additional client using the username that was used in setting up the remote desktop session, and that when the server-side data exchange program detects that such an additional remote desktop session has been set up, that data exchange connection, and in particular also the remote desktop session, is terminated, and an additional data exchange connection between the additional client and the server is set up using the same username.

BRIEF DESCRIPTION OF THE SEVERAL VIEWS OF THE DRAWING

A particularly advantageous embodiment of a procedure according to the invention is described in greater detail in connection with FIG. 1.

DESCRIPTION OF THE INVENTION

Figure 1:
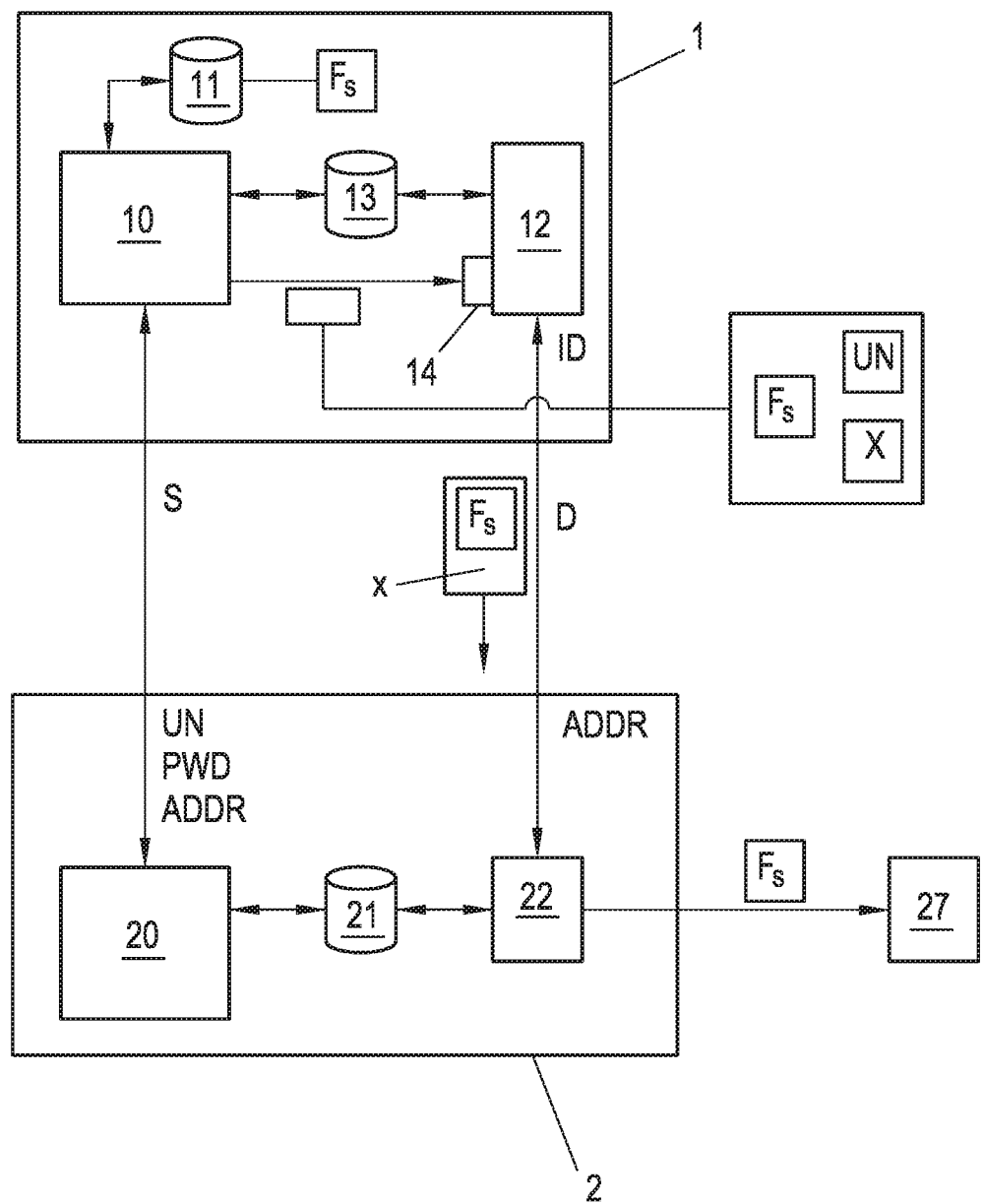

FIG. 1 shows a system comprising a server 1 on which server software 10 is installed for setting up a remote desktop session S; $S_1$; $S_2$ between the server 1 and a client 2. The system also comprises a client 2 as shown in FIG. 1, on which client software 20 for setting up a remote desktop session S; $S_1$; $S_2$ is installed that is capable of communicating over a network with the server software 10 installed on the server 1 and of setting up a remote desktop session S; $S_1$; $S_2$.

An operating system is running on the server 10 and different software packages are installed that are required for the respective user of Client 2; the client 2 may access these packages virtually after setting up the remote desktop session S; $S_1$; $S_2$.

In a first step, a remote desktop session S; $S_1$; $S_2$ is set up between the client 2 and the server 1. For this purpose, the client 2 provides a username UN and a password PWD. The client 2 also knows the connection address ADDR of server 1 in the relevant network, for example the IP address of the server 1.

In a second step, the username UN and connection address ADDR used for setting up the remote desktop session S; $S_1$; $S_2$ are stored locally on the client computer 2. This information is usually stored in a local configuration 21, which is called a registry on Windows systems.

In addition to the client software 20 for setting up a remote desktop session S; $S_1$; $S_2$, a client-side data exchange program 22 is installed on the client 2, which sets up a data exchange connection D; $D_1$; $D_2$ with a server-side data exchange program 12 that runs on the server 1.

In this case, a key ID that identifies the data exchange connection D; $D_1$; $D_2$ and is unique for the entire server is assigned from the server 1 to the client 2 in advance and without knowledge of any remote desktop session S; $S_1$; $S_2$ that may exist between the client 1 and the server 1. To set up a data exchange connection D; $D_1$; $D_2$, the address ADDR of the server 1 is known to the client-side data exchange program 22. Before or after or during running a parallel remote desktop session S; $S_1$; $S_2$ between the server 1 and the client 2 in the local configuration 21 of the client 2, the client-side data exchange program 22 searches for the username UN of a logged-on user who has set up a remote desktop session S; $S_1$; $S_2$ with the server 1 with which the client-side data exchange program 22 is also in data exchange connection D; $D_1$; $D_2$. In this case, when a remote desktop session S; $S_1$; $S_2$ is set up for the first time between the client 2 and the server 1, the client-side data exchange program 22 detects an entry in the local configuration 21 for the first time, with which a remote desktop session S; $S_1$; $S_2$ was started under a username UN at the address ADDR of the relevant server 1. As soon as the client-side data exchange program has found the relevant username UN, it transfers the username UN to the server-side data exchange program 12. The server-side data exchange program 12 in turn searches for a remote desktop session S; $S_1$; $S_2$ set up by the server software 10, in which a user is logged in with a certain predetermined username UN. The information available on the server side, namely the username UN, which is used for the relevant remote desktop session S; $S_1$; $S_2$, and the key ID, which the server-side data exchange program 12 has allocated to the client 1, are assigned to each other and stored in an assignment table 13.

In the course of executing a program as part of the remote desktop session S; $S_1$; $S_2$ on the server 1, it is also possible for this program to access routines that the server-side data exchange program 12 makes available.

For this purpose, the server-side data exchange program 12 provides an interface 14 via which a program running in the remote desktop session S; $S_1$; $S_2$ may send program calls X. If such a program passes a program call X to this interface 14, the server-side data exchange program 12 searches for the key ID of the client 1 that, according to the assignment table 13, has the username UN of the user using the remote desktop session. The server-side data exchange program 12 sends the issued program call X to the client 1 or the data exchange program 22 of the client 1 to which the relevant key ID is assigned. In addition, it is possible to transmit files $F_s$ from server 1 to client 2 in addition to the bare program call X.

In the present case, for example, it is shown how a document $F_s$ stored on server 1 and, for example, stored in a database 11 may be printed client-side. For this purpose, the remote desktop session server software 10 calls the interface 14 and transfers the file $F_s$ to be printed locally by client 2 to the interface 14, together with a program call X requesting printing. After the server-side data exchange program 12 has identified, with the aid of the assignment table 13, the client 2 or the client-side data exchange program 22 to which the program call X and the file $F_s$ attached to the program call X are to be transmitted, the program call X used for printing and the electronic document $F_s$ to be printed are transmitted from the server-side data exchange program 12 to the relevant client-side data exchange program 22 of the selected client 2. The client-side data exchange program 22 receives the file $F_s$ as well as the print command contained in the program call X and executes it on a client-side printer 27 according to the local configuration 21 undertaken at the client 2.

On Windows systems, local configuration information that is relevant to printing is usually also stored in the registry 21 and specifies which specific client-side program is to be used to print the file $F_s$. If, for example, a print command and a file $F_s$ in PDF format are transferred from the server 1 to the client 2, it is not clear for the server 1 which program is used to print the file $F_s$, because it does not know the local configuration of the client 2. Also, it is usually not possible or desired to specify server-side the programs the client 2 should use to print documents $F_s$. Therefore, the local data exchange program 22 of client 2 converts the print command according to the local configuration 21 into a command that causes the program available on client 2 to handle printing the relevant document $F_s$. The document $F_s$ is then printed and is available to the user of Client 2 in paper form.

Different printing options are also particularly advantageous. For example, it may be specified server-side in the program call X that the print command should print on a locally-specified standard printer 27 or on an alternate printer. Finally, the user may also be given the choice of which printer 27 the user wants to use to print the relevant document $F_s$. In this case, the program specified in a local configuration 21 is instructed, before printing, to provide a print dialog in which the user may select from the available printers 27 and, if necessary, specify additional print options.

In addition to printing documents $F_s$ transmitted by the server 1, it is also possible to display a document $F_s$ transmitted from the server 1 to the client 2 by selecting the corresponding program call X. Also for displaying documents $F_s$, typically a standard program SP assigned to the relevant file type of the document $F_s$ is stored in the local configuration 21 of the client 2, and this program displays the document visually for the user when the document $F_s$ is called via the client 2.

Another program call X, which may be transmitted from the server 1 to the client 2, is a call to send an e-mail. The recipient, the subject and the text content of the e-mail may be predetermined by the program running in the remote desktop session, and the interface 14 may be transferred to the program call X. In addition, there is also the possibility that files $F_s$ are transferred on the server 1 as an attachment together with the e-mail. If such a program call X arrives at the client 2, the client-side data exchange program 22 causes the standard e-mail program to create a new e-mail using the default e-mail address for outgoing emails, with which the information specified in the program call X, such as recipient, subject, text content and attachments, is associated. If necessary, it may also be specified whether the e-mail in question is to be sent with or without consulting the user of the relevant client 2.

Figure 2:
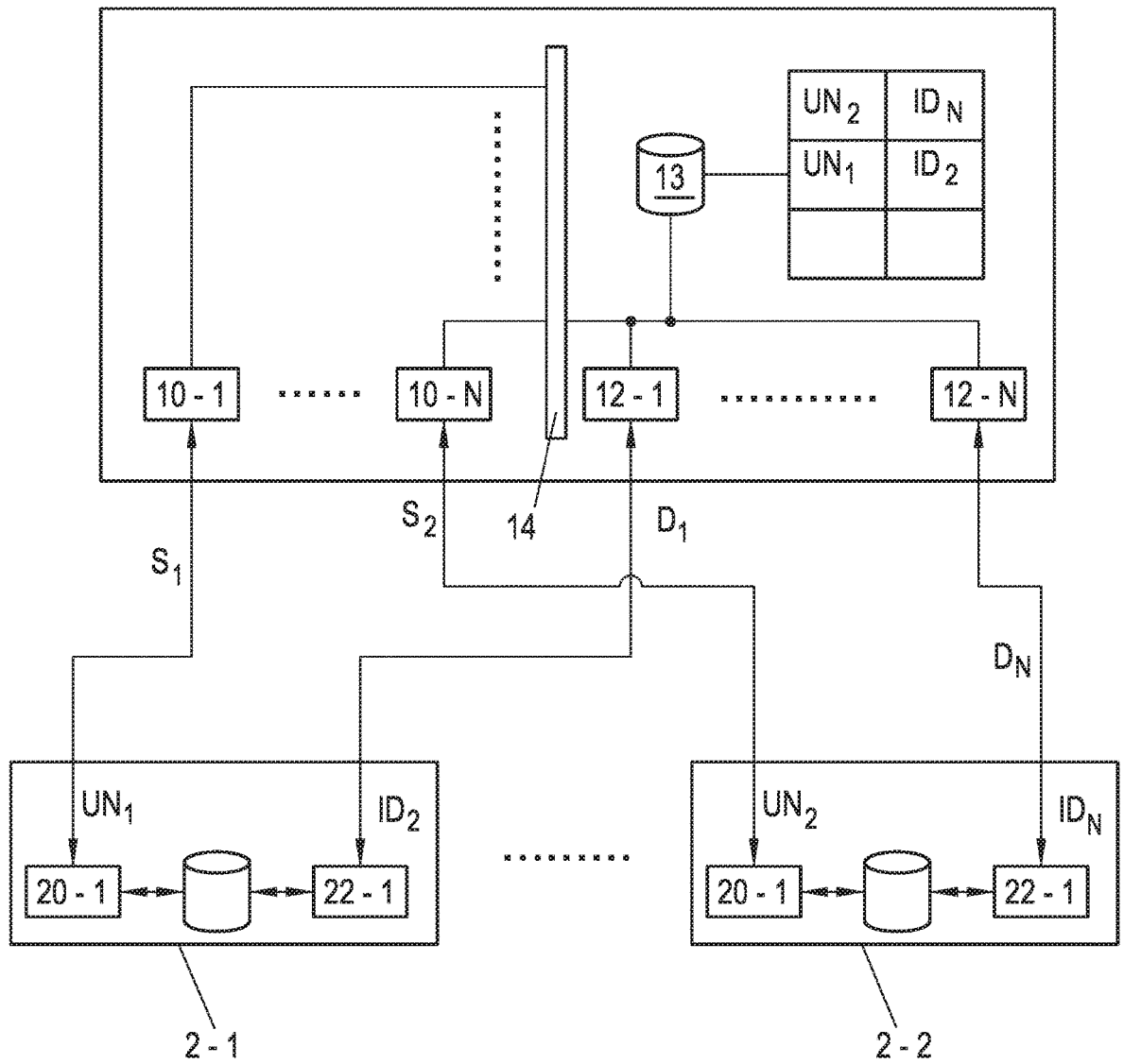
In FIG. 2, the setup and use of one embodiment of the invention with a plurality of clients in a network is shown in greater detail.

FIG. 2 shows another preferred embodiment of the invention with a server 1, which corresponds to the server shown in FIG. 1 and has a data link with a multiplicity of clients. The individual clients typically have the same setup as the clients shown in FIG. 1.

Notably, on each individual client, one client software 20 for setting up a remote desktop session S; $S_1$; $S_2$ is respectively running, and one client-side data exchange program 22-N, . . . , 22-N is also respectively running for setting up a respective data exchange connection D; $D_1$; $D_2$. On the server 1, a respective server program 10-1, . . . , 10-N and a server-side data exchange program 12-1, . . . , 12-N run respectively for each individual client 2-1, . . . , 2-N. Via the relevant assignment table 13, it is ensured that each individual client 2-1, . . . , 2-N receives, by means of the server-side data exchange program 12-1, . . . , 12-N respectively assigned to it, the program calls that have been sent from a remote desktop session S; $S_1$; $S_2$ assigned to that client.

As with the first exemplary embodiment of the invention, the remote desktop Session S; $S_1$; $S_2$ and the data exchange connection D; $D_1$; $D_2$ may be set up independently of each other. For the setup of a remote desktop session S; $S_1$; $S_2$, the steps described in connection with the first embodiment of the invention are carried out, and at the end of the setup of the remote desktop session S; $S_1$; $S_2$, the username UN and the server address ADDR are respectively stored in the local configuration 21 of the client 2-1, . . . , 2-N. Independently of this, a key $ID_1$, $ID_N$ is assigned server-side when setting up the respective data exchange connection D; $D_1$; $D_2$, and this key uniquely identifies each data exchange connection D; $D_1$; $D_2$ that has been set up. If a remote desktop session S; $S_1$; $S_2$ has already been set up between one of the clients 2-1, . . . , 2-N and the server 1 and a corresponding entry has already been made in the local configuration 21 of a client 2-1, . . . , 2-N, the client-side data exchange program 22-1, . . . , 22-N of the respective client 2-1, . . . , 2-N may read the respective username $UN_1$, $UN_2$ from the local configuration 21 of the respective client 2-1, . . . , 2-N and transmit the username to the respective server-side data exchange program 12, which then assigns the relevant connection key $ID_1$, $ID_N$ to the username $UN_1$, $UN_2$ and stores this assignment in the assignment table 13. Even if no remote desktop session S; $S_1$; $S_2$ is currently running on a specific client 2-1, . . . , 2-N, a message from the client-side data exchange program 22 may be sent to the server-side data exchange program 12 based on the last assignment between server address ADDR and username UN that is stored in the local configuration, and this program will then make an entry in the assignment table 13.

Figure 3:
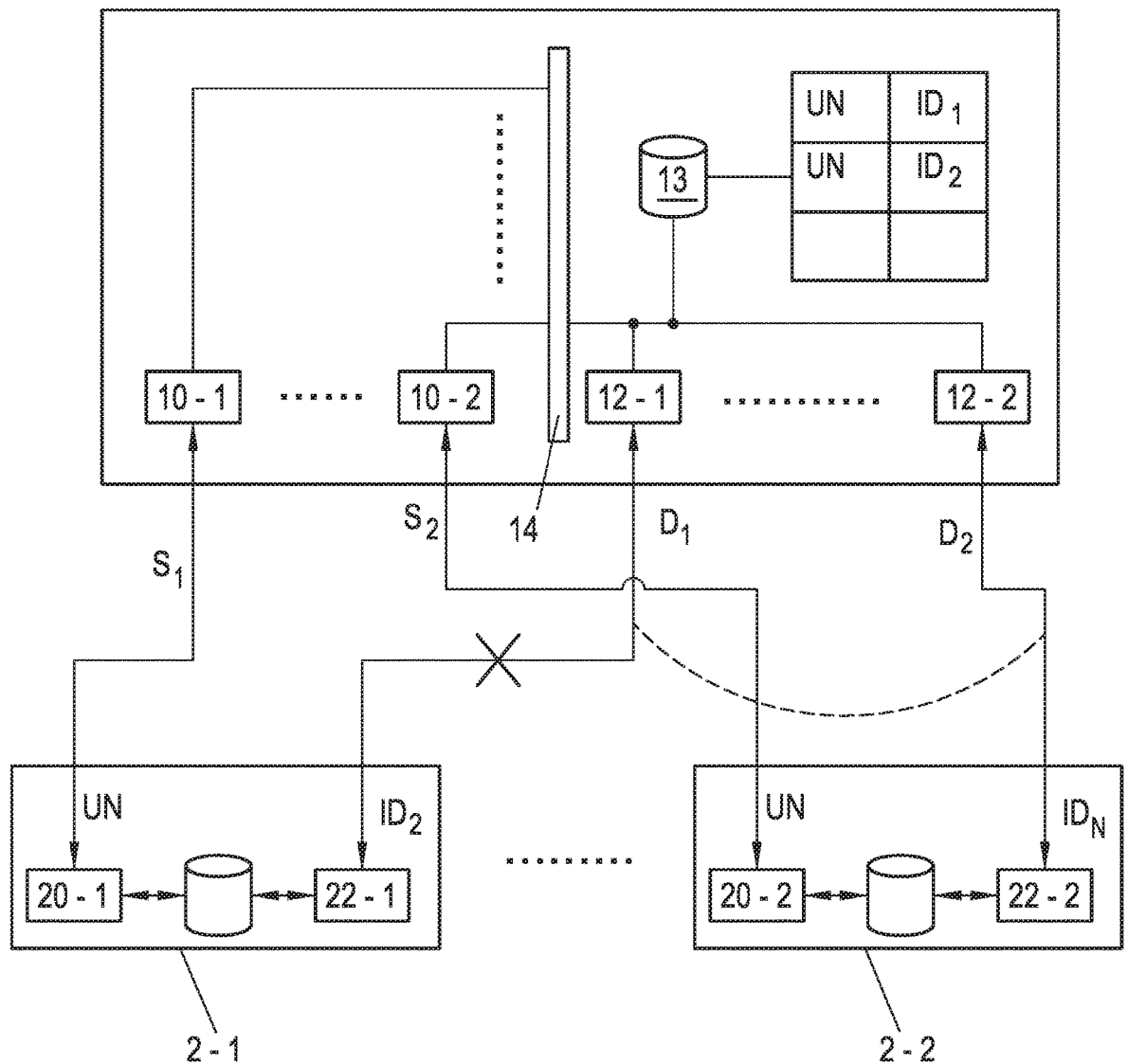
FIG. 3 shows the takeover of a data exchange connection by a client.
Figure 4:
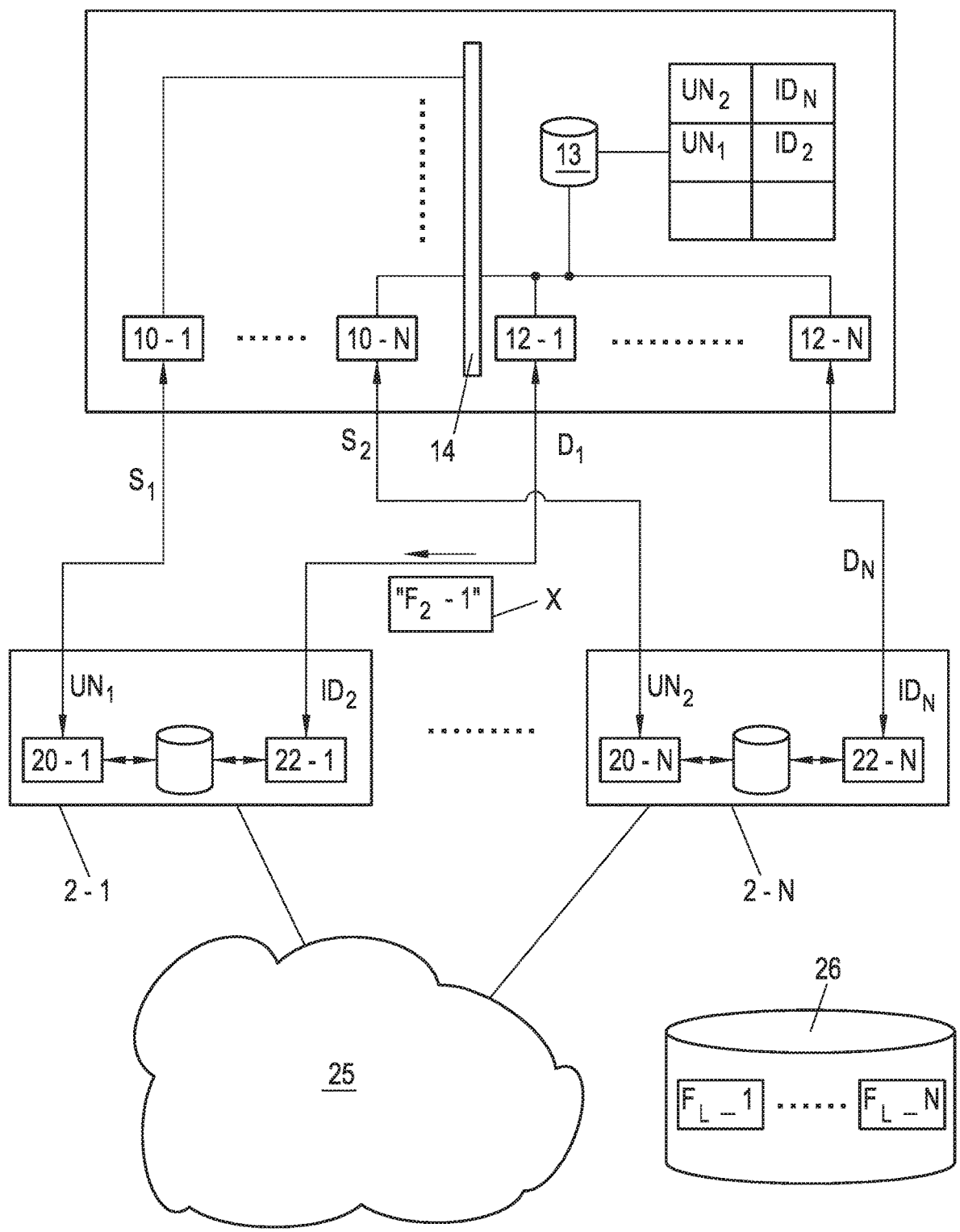
FIG. 4 shows a network in which a script is executed locally.

It is not necessary for every user to always use the same client computer 2-1, . . . , 2-N. As shown in FIG. 3, scenarios may occur in which individual users set up remote desktop sessions $S_1$, . . . , $S_N$ with the server 1 from different clients 2-1, . . . , 2-N. In this case, it is possible that a data exchange connection D already exists between a client 2-1 and the server 1 when the same user starts a remote desktop session $S_2$ from another client 2-2 and also wants to set up another data exchange connection to the server 1 via another client 2-2.

The server-side data exchange program 12 is able to detect such an occurrence because in such a case, an attempt is made to set up a data exchange connection to the server from different clients 2-1, 2-2 using the same username UN.

One way of handling such a phenomenon is to set up the data exchange connection $D_2$ with the last requesting client 2-2 and to terminate the previous data exchange connection D, without further consulting the user. From now on, program calls X that are transmitted from the server software 10 via the interface 14 and the server-side data exchange program 12 will be transmitted exclusively to that client 2-2 the data exchange connection D of which was most recently set up.

Alternatively, certain query mechanisms may be provided that make it possible to identify the client 2 at which the user is actually located. For this purpose, for example, a message may be transmitted from the server-side data exchange program 12 to both client-side data exchange programs 22-1, 22-2 using the same username, requesting that the relevant user indicate whether the user is actually on the relevant client 2. A dialog is displayed with a control element that the user should press to confirm. If the user presses the control element displayed based on the message on the client 2, the client 2-2 on which the user pressed the control element sends a corresponding message back to the server 1, so that the server assigns the relevant user to the client 2-2 from which the confirmation was transmitted. In the assignment table 13 of the server, the ID of the client 2-2 is assigned to the username UN.

In this way, it is not only possible for users in individual local networks to [use] different clients 2-1, 2-2 in separate local networks and perform actions from different clients 2-1, 2-2. It is also possible for individual users to use a plurality of devices, for example mobile devices, as clients 2-1, 2-2, etc. via which the users may communicate with the relevant server 1 from different positions.

A preferred refinement, which is especially advantageous for local networks 25 that have a multiplicity of clients 2-1, ..., 2-N, but may also be used independently, allows access to local files stored on the client 2-1, ..., 2-N or in a local network 25 to which the respective client 2-1, ..., 2-N has access. In this context, it is possible to store in the database running on server 1 of the remote desktop session only references to files $F_L$ located in the local network 25 in which the clients 2-1, ..., 2-N are also located. For example, if a plurality of clients 2-1, ..., 2-N have access to a network drive 26, they may jointly access files $F_L$ without using the server 1.

If data about these locally stored files $F_L$ is handled in a remote desktop session $S_1$, the relevant files $F_L$ are not stored on the server 1, and thus for example, in the remote desktop session $S_1$ on the server 1, a query may be made for the properties of these files $F_L$ that are stored on the server, even if these files are not on the server at all. In the database of the server, instead of the relevant file $F_L$ there is only a relative path specification, i.e. a specification of where the file is located in the local network.

In particular, it is possible to search on the server for such locally stored individual files $F_L$ and to display the files found. To provide such a display, a program call X is created in which the relevant relative path of the respective file is specified. However, the file $F_L$ is not transferred with this program call, because the file is not available on the server 1.

The type of program call takes place similarly to the first exemplary embodiment of the invention, with only a file path being specified instead of the saved file $F_s$. The file path is transmitted to the client 2-1 in the relevant program call X. In the configuration 21 of the client 2, a path prefix is set that may be prefixed to the path received in the program call, in order to obtain a path of the file $F_L$ that is valid in the local network 25 of the client 2. The action defined in program call X may now be performed with regard to the specified file $F_L$, using the final file path that has been assembled in this way.

In particular, the locally-stored path prefix has the advantage of specifying the access information that is valid for the client in each case, such as the drive designation, attachment point, and data transfer protocol, which each respectively depend exclusively on the type of connection of the client 2 with the database 26, without this connection needing to be carried out specifically on the server 1.

Thus, it is sufficient to store a relative path specification on the server 1 that specifies the location of the file $F_L$ relative to a predetermined path. A path prefix is specified for each individual client, specifying how the root node of the respective path specified by the server 1 may be reached. For example, this shared database 26 may be mounted on the drive letter I of one of the clients 2-1, while the same path is mounted under \media\S on a Unix client. On a portable laptop that is exclusively connected to the database via the Internet, a corresponding data transfer protocol, for example SSH or FDP, may be specified and prefixed to the path.

Another preferred embodiment of the invention makes it possible to execute a multiplicity of specified actions that have been specified on the server 1 in sequence on the client 2, for example to avoid the repeated transfer of large amounts of data between the client 2 and the server 1. For example, one use case of the invention could be that a program running on the remote desktop session S; $S_1$; $S_2$ wants to instruct the client 2 to combine locally-stored documents $F_L$-1, ..., $F_L$-N that it has selected into a complete document $F_L$.

Different software packages are available for merging documents $F_L$-1, ..., $F_L$-N, for example PDF documents; the server 1 does not know which of the software packages is installed on client 2. In order to avoid all the files $F_L$-1, ..., $F_L$-N being transmitted from the client 2 to the server 1 for the purpose of merging and then a merged file $F_L$-N being transmitted back from the server 1 to the client 2, a script may also be transmitted from the server 1 to the client 2 in which it is specified that a certain selection of PDF files $F_L$-1, ..., $F_L$-N, which the selection results for example from a database query executed on the server 1, should be merged and saved as a combined document $F_L$. This script is sent to the client 2, the local configuration 21 of which contains a standard program SP for merging PDF documents. The client 2 searches for the relevant locally stored files $F_L$-1, ..., $F_L$-N as shown in the previous exemplary embodiment, and joins them together using the standard program SP available to it so as to form a large document $F_L$, and accordingly displays this document for the user.

The invention claimed is:

1. A method for executing a program call specified by a server via a client, which comprises the steps of:
   a) setting up a remote desktop session between the client and the server at a request of the client, wherein a username and a password that are allocated to a user are transmitted from the client to the server, a connection address of the server is specified by the user;

b) storing the connection address and the username locally with the client after the remote desktop session has been set up;
c) running a client-side data exchange program on the client which sets up a data exchange connection to a server-side data exchange program running on the server, and the server-side data exchange program assigns a key that uniquely identifies the data exchange connection after the data exchange connection has been set up;
d) ascertaining, via the client-side data exchange program, the username of the user who has currently or most recently set up the remote desktop session with the server based on a locally stored assignment between the username and the connection address of the server;
e) transmitting the username of the user from the client-side data exchange program to the server-side data exchange program if the user is found;
f) storing, via the server-side data exchange program, the username together with the key that identifies the data exchange connection in an assignment table;
g) executing a program on the server if the remote desktop session exists;
h) transmitting, via the program, a program call to an interface provided by the server-side data exchange program, and the username used for the remote desktop session is attached to the program call;
i) wherein the server-side data exchange program searches for the key assigned to the username in the assignment table based on the username;
j) transmitting, via the server-side data exchange program, the program call to the client that has a connection with the key; and
k) wherein the client-side data exchange program adapts the program call it receives to a local client-side configuration and subsequently executes it.

2. The method according to claim 1,
wherein in the step j), the server-side data exchange program searches for files that are specified in the program call and are required for the program call and transmits the files together with the program call to the client; and
wherein for the client-side data exchange program in the step k), a standard program is selected that is stored in the local client-side configuration of the client for handling files of a type corresponding to a type of a transmitted file and the standard program is caused to handle the transmitted file according to the program call.

3. The method according to claim 2, wherein standard calls of standard programs are specified in the local client-side configuration of the client for certain predetermined types of program calls and file types, and in that, in an event that the program call of a relevant type is to be executed with respect to a file of a relevant file type, a relevant standard call is executed using the file.

4. The method according to claim 2, wherein the standard program handling the transmitted file according to the program call holds the transmitted file ready for viewing and/or modification or to print the transmitted file.

5. The method according to claim 1,
wherein the client has a data link to a memory that has a number of files;
wherein in the step j) the program call is created that relates to a file located in the memory;
wherein in the step k), the client-side data exchange program ascertains and locates a relevant file; and
wherein for the client-side data exchange program in the step k), a standard program is selected that is stored in the local client-side configuration for handling files of a type corresponding to a type of a transmitted file, and the standard program is caused to handle the relevant file according to the program call.

6. The method according to claim 5, wherein the standard program handles the relevant file according to the program call by holding the relevant file ready for viewing and/or modification or to print the relevant file.

7. The method according to claim 1, wherein after the remote desktop session and the data exchange connection have been set up between the client and the server, an additional remote desktop session is set up from an additional client using the username used in setting up the remote desktop session, and in that when the server-side data exchange program detects that the additional remote desktop session has been set up, the data exchange connection is terminated and an additional data exchange connection is set up between the additional client and the server, using a same username.

8. The method according to claim 7, wherein the remote desktop session is terminated.

9. The method according to claim 1,
wherein in the step j), the program call for executing a script on the client is specified, to which are optionally attached a number of files to be transferred and/or a number of paths to locally stored files; and
wherein in the step k), the script is executed by the client-side data exchange program, which optionally accesses transmitted files or the locally stored files.

10. The method according to claim 1, wherein the program call consists of:
opening files for editing or viewing; and/or
printing the files on a printer predetermined via the program call or a standard printer, without consulting the user; and/or
printing the files via a print dialog; and/or
copying a file into a predetermined folder or a user-specified folder; and/or
writing an e-mail based on a recipient, subject and body text specified in the program call and, if applicable, at least one file transmitted by the server and/or specified by indicating a path.

* * * * *